US009726577B2

(12) United States Patent
Gordon et al.

(10) Patent No.: US 9,726,577 B2
(45) Date of Patent: Aug. 8, 2017

(54) VEHICLE MISSION CAPABILITY PREDICTION SYSTEM AND METHOD

(71) Applicant: HONEYWELL INTERNATIONAL INC., Morristown, NJ (US)

(72) Inventors: Grant Gordon, Peoria, AZ (US); Richard Ling, Scottsdale, AZ (US); Michael James, Phoenix, AZ (US); Kevin Moeckly, Chandler, AZ (US)

(73) Assignee: HONEYWELL INTERNATAIONL INC., Morris Plains, NJ (US)

( * ) Notice: Subject to any disclaimer, the term of this patent is extended or adjusted under 35 U.S.C. 154(b) by 377 days.

(21) Appl. No.: 14/294,440

(22) Filed: Jun. 3, 2014

(65) Prior Publication Data

US 2015/0346059 A1 Dec. 3, 2015

(51) Int. Cl.
*G01M 15/14* (2006.01)
(52) U.S. Cl.
CPC .................................. *G01M 15/14* (2013.01)
(58) Field of Classification Search
None
See application file for complete search history.

(56) References Cited

U.S. PATENT DOCUMENTS

| 8,068,997 | B2 | 11/2011 | Ling et al. | |
|---|---|---|---|---|
| 8,594,924 | B2 | 11/2013 | King et al. | |
| 2009/0240470 | A1 | 9/2009 | Ling et al. | |
| 2010/0204931 | A1 | 8/2010 | Ling et al. | |
| 2013/0325219 | A1* | 12/2013 | Pitard | G07C 5/0825 701/14 |

OTHER PUBLICATIONS

Peterson, et al.: "Forecasting exposure to volcanic ash based on ash dispersion modeling" University of Alaska, Fairbanks, Mar. 10, 2008.

* cited by examiner

*Primary Examiner* — Thomas G Black
*Assistant Examiner* — Ce Li
(74) *Attorney, Agent, or Firm* — Lorenz & Kopf, LLP

(57) ABSTRACT

A system method for predicting vehicle mission capability for a vehicle that is propelled by an engine includes collecting engine degradation data for the engine. Location independent engine degradation data are generated from the collected engine degradation data. The location independent engine degradation data are representative of engine degradation that is independent of locations associated with the mission. Predictions of location dependent engine degradation are calculated from the collected engine degradation data and the location independent engine degradation data. The location dependent engine degradation is representative of engine degradation due to movement through locations associated with the mission.

18 Claims, 3 Drawing Sheets

VEHICLE MISSION CAPABILITY PREDICTION SYSTEM AND METHOD

TECHNICAL FIELD

The present invention generally relates to vehicle mission planning, and more particularly relates to a system and method for predicting the mission capability of a vehicle.

BACKGROUND

Many systems are subject to some type of performance assessment upon system start-up and initialization to determine the capability of the system to perform various functions without exceeding a limit. For example, gas turbine engines used in aerospace applications, such as helicopters, are often subject to a daily pre-flight power assurance test before beginning a mission. The purpose of the daily power assurance test is to establish the power available from the helicopter engine(s) and to determine if those engines meet a minimum power required to perform the mission.

Although the above-described daily power assurance tests establish the engine health status when the test is performed and they indicate if an engine(s) is capable of meeting a minimum power condition required to initiate a mission they do not predict how the engine will deteriorate over the flight path. Some missions cause more aggressive engine deterioration than others. There is risk that the engine will deteriorate during the mission such that the mission cannot be completed. In addition these above-described daily power assurance tests do not predict how an engine or a plurality of engines within a fleet will degrade over various scenarios ranging from single to multiple mission usage.

Hence, there is a need for a system and method for predicting how the engine will degrade over a single mission as well as over a plurality of missions and/or a system and method that predicts the mission capability of an engine or a fleet of engines. There is a need for a system and method that can predict when engine(s) overhaul will be required based on the planned future mission usage. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method for predicting vehicle mission capability for a vehicle that is propelled by an engine includes collecting engine degradation data for the engine. The engine degradation data comprises calculations of engine degradation associated with a mission the vehicle has completed. Location independent engine degradation data are generated from the collected engine degradation data. The location independent engine degradation data are representative of engine degradation that is independent of locations associated with the mission. Predictions of location dependent engine degradation are calculated from the collected engine degradation data and the location independent engine degradation data. The location dependent engine degradation is representative of engine degradation due to movement through locations associated with the mission.

In another embodiment, a vehicle mission capability prediction system includes a mission processor. The mission data processor is adapted to selectively receive engine degradation data associated with a vehicle that is propelled by an engine. The engine degradation data comprises a calculation of engine degradation associated with a mission the vehicle has completed. The mission data processor is configured, upon retrieval of the engine degradation data, to generate, from the collected engine degradation data, location independent engine degradation data, and predictions of location dependent engine degradation. The location independent engine degradation data are representative of engine degradation that is independent of locations associated with the mission, and the location dependent engine degradation are representative of engine degradation due to movement through locations associated with the mission.

In yet another embodiment, a vehicle mission capability prediction system includes a degradation database, a vehicle processor, and a mission data processor. The database is coupled to receive and store location independent engine degradation data and predictions of location dependent engine degradation data. The location independent engine degradation data are representative of engine degradation that is independent of locations associated with a mission the vehicle has completed. The location dependent engine degradations are representative of engine degradation due to movement through locations associated with the mission. The vehicle processor is configured to collect mission data, conduct a continuous performance analysis for the engine, and generate the engine degradation data from the mission data and the continuous performance analysis. The mission data include at least, position data, and vehicle load data but could also include, for example, weather data and data provided by the avionics systems during the mission. The mission data processor is in operable communication with the database and the vehicle processor. The mission data processor is configured to selectively receive the mission data and the engine degradation data and, upon retrieval of the engine degradation system, to: generate, from the engine degradation data, the location independent engine degradation data, calculate, from the collected engine degradation data and the location independent engine degradation data, predictions of location dependent engine degradation, and calculate a probability that a vehicle can complete a new mission based on the calculated predictions of path dependent engine degradation and the continuous performance analysis.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
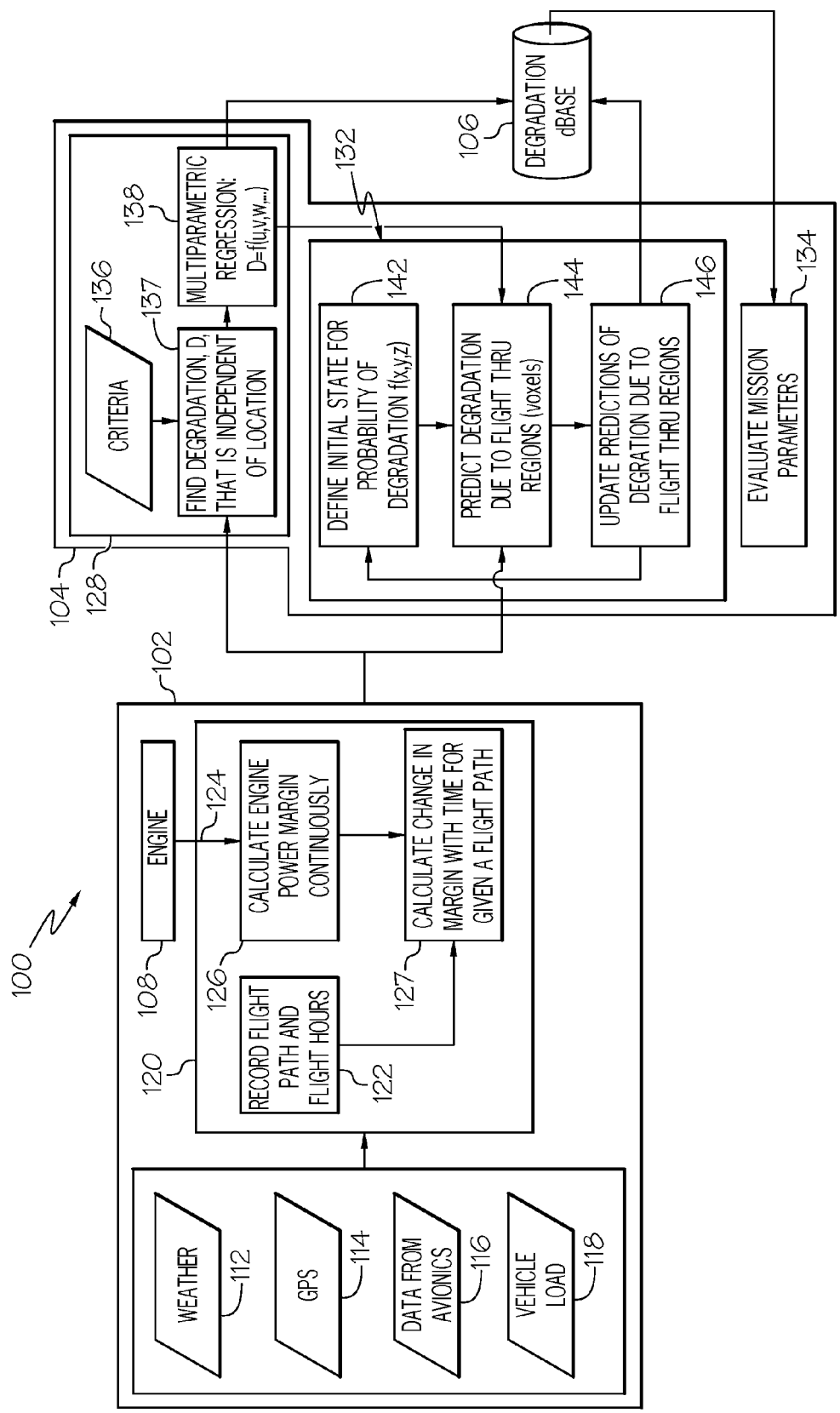
FIG. 1 depicts a functional block diagram of an embodiment of an engine performance degradation and mission capability prediction system.

Referring to FIG. 1, a functional block diagram of an embodiment of a vehicle engine performance degradation and mission capability prediction system 100 is depicted, and includes one or more vehicles 102, a mission data processor 104, and a degradation database 106. Each vehicle 102 is equipped with one or more engines 108 as a propulsion source. The vehicle(s) 102 may be configured as an aircraft, a watercraft, a spacecraft, an automobile, or any one of numerous other terrestrial and non-terrestrial vehicles. In a particular preferred embodiment, the vehicle(s) 102 is(are) an aircraft, and more particularly a rotary wing aircraft, such as a helicopter, and the engine(s) 108 is(are) a gas turbine engine.

Regardless of how the vehicle 102 is specifically implemented, it is configured to collect mission data while it is executing a mission. These mission data may vary, but include at least, position data, and vehicle load data but could also include, for example, weather data and data provided by the avionics systems. Thus, as may be appreciated, each vehicle 102 is preferably equipped with at least a weather data source 112, a location data source 114, an avionics data source 116, and a vehicle load data source 118. It will be appreciated that the data, and associated data sources, are merely exemplary, and that additional data, and associated data sources, may be used.

The weather data source 112 is configured to collect and/or retrieve weather data and supply weather data representative thereof. The weather data source 112 may be implemented using suitable meteorological sensors on board the vehicle 102, or as a system that is configured to receive weather data from one or more external sources. The position data source 114 is configured to track vehicle position and supply position data representative thereof. The position data source 114 may be variously implemented, but in the depicted embodiment it is implemented using a global positioning system (GPS).

The avionics data, and thus the avionics data source 116, may also vary. The avionics data source 116, in the depicted embodiment, includes the aircraft avionics system and associated subsystems. The avionics data collected and supplied by the avionics data source 116 include ambient temperature and pressure, altitude, vehicle speed, wind velocity, just to name a few. It will be appreciated that when the vehicle 102 is other than an aircraft, the so-called avionics data source 116 may be referred to using other monikers.

The vehicle load data source 118 may be an onboard device that is configured to sense the load (e.g., weight) of the vehicle. It may also be a processing device that includes a user interface that allows a user to input load-related information, such as payload, number of passengers, amount of fuel, and any one or more of numerous other factors that may impact the load on the vehicle.

As FIG. 1 further depicts, the mission data that are collected during a mission are supplied to a vehicle processor 120. The vehicle processor 120 is configured, in response to the mission data, to record path and duration information associated with the mission 122. It will be appreciated that the path information will include the various mission data described above (weather, load, avionics, etc.) throughout the duration of, and along the path of, the mission.

The vehicle processor 120 is also coupled to receive engine data 124 from the engine 108 during the mission. The vehicle processor 120 is configured, in response to the engine data 124, to conduct a continuous performance analysis of the engine 108 throughout the mission 126. The continuous performance analysis 126 that is conducted provides a continuous, real-time estimate of the power available from the engine 108, and thus a continuous, real-time estimate of how the engine 108 may be degrading throughout the mission. It will be appreciated that the engine data 124 supplied to the vehicle processor 120 may vary, and may depend on the specific configuration and implementation of the engine. When the engine 108 is implemented using a gas turbine engine, however, these data 124 include at least data representative of, or that may be used to determine, engine inlet pressure, engine inlet temperature, engine speed, fuel flow, compressor discharge pressure, power turbine inlet temperature, engine torque, shaft horsepower, and thrust, to name just a few.

Figure 3:
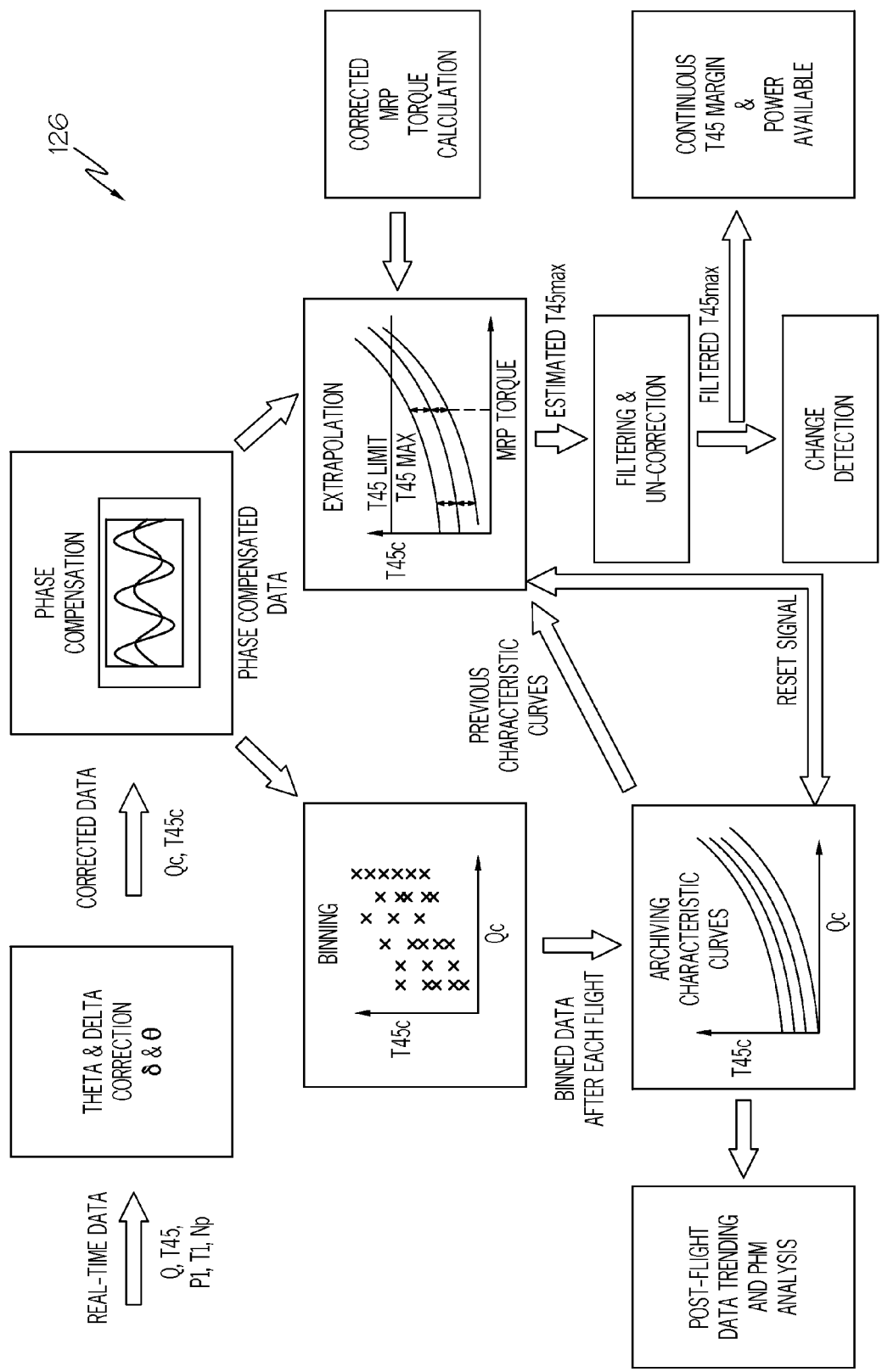
FIG. 3 depicts a process diagram of an exemplary method that may be implemented by the system of FIG. 1 to conduct a continuous performance analysis.

Before proceeding further, it is noted that the methodology used to conduct the continuous performance analysis 126 is depicted in FIG. 3 of the instant application, and is described in U.S. patent application Ser. No. 12/367,182, which was filed Feb. 6, 2009, and issued as U.S. Pat. No. 8,068,997 on Nov. 29, 2011, and which is entitled, "Continuous Performance Analysis System and Method." That patent, which is assigned to the Assignee of the present application, and shares two common inventors, is hereby incorporated by reference.

Returning once again to FIG. 1, the vehicle processor 120 is additionally configured, using the path and duration information 122 and the continuous performance analysis 126, to generate calculations of engine degradation associated with the particular mission the vehicle 102 is executing. The resultant calculations are referred to herein as engine degradation data 127, and these data are supplied to the mission data processor 104. It is noted that engine degradation is determined at all points over the mission that the vehicle 102 is executing. That is, the mission, and more specifically the path that the vehicle 102 takes while executing the mission, is divided into a plurality of discrete portions (or cells, voxels, etc.). This, as will be described in more detail further below, allows the system 100 to predict engine degradation for not only over an entire planned mission path, but within discrete portions (or locations) along a planned mission path. It should be noted that when the vehicle is implemented as an aircraft, for example, the discrete portions may be voxels.

The mission data processor 104 is configured to selectively receive, from a plurality of vehicles 102, the engine degradation data 127 associated with each of the individual vehicles 102. The mission data processor 104, which may be implemented using one or more processing devices, is configured, upon receipt of the engine degradation data, to implement several functions. These functions, which will each be described in more detail, include generating location independent engine degradation data 128, calculating predictions of location dependent engine degradation 132, and evaluating various mission-related parameters 134. The various mission-related parameters may vary, but include calculating a probability that one or more vehicles 102 can complete a new mission or missions, and evaluating one or more optimization criteria associated with a new mission or missions.

Before describing each of the above-mentioned functions, it is noted that overall engine degradation (D) may be represented as the combination of two data sets (e.g., D=f(x, y, z)+g(u, v, w, . . . )). These two data sets include those data that are functionally dependent on location (e.g., f(x, y, z)) and those data that are independent of location (e.g., g(u, v, w)). In particular, it is generally known that in certain operational areas, engine degradation is location dependent, whereas in other operational areas, engine degradation is independent of location (e.g. f=0). For example, if a vehicle 102 completes a 100 mile mission (entirely or partially) in a relatively dusty environment (e.g., in a desert), the engine 108 will likely experience more degradation than if the vehicle completed the same 100 mile mission (entirely or partially) in a relatively dust-free environment.

Turning now to the description of how the mission data processor 104 generates the location independent engine degradation data 128, the mission data processor 104 compares the received engine degradation data to certain predetermined criteria 136 to select/filter those data 137 that are associated with the predetermined criteria 136. These predetermined criteria 136 may vary, but are generally criteria associated with locations/environments where, based, for example, on previous experience and/or engineering judgment, engine degradation is location independent.

Regardless of the specific criteria, the selected/filtered data 137 are then processed using, for example, a multi-parametric regression 138 to correlate engine degradation per unit time to a set of predetermined operational parameters (e.g., $D_{LOC\_INDEP}$=g(u, v, w, . . . )), to thereby generate the above-mentioned location independent engine degradation data 128. As may be appreciated, these data are representative of engine degradation that is independent of locations associated with a mission. In other words, these data are representative of engine degradation that would occur regardless of the specific location/environment. It will be appreciated that the specific operational parameters (u, v, w, . . . ) may vary, and that a sensitivity analysis may be used to determine which operational parameters are most relevant. In a particular embodiment, however, one or more of vehicle speed, vehicle load, wind direction, air temperature, and weather factors, just to name a few, may be used.

The location independent engine degradation data 128 are supplied to, and stored in, the degradation database 106. The location independent degradation data 128 are also supplied, together with the previously retrieved engine degradation data 127, to a Bayesian framework to calculate the predictions of location dependent engine degradation 132. The Bayesian framework allows the build-up of observations of engine degradation per unit time within each of discrete portions of the mission. Each engine degradation datum adds observations to help defining a probability density function (PDF) for engine degradation as a function of location (discretized to a volume cell). With the defined PDF for each cell, the relative likelihood of engine degradation as a function of location, and hence over a mission, may be calculated. As is generally known, a Bayesian framework, as described herein, provides improved estimates as more engine degradation data are collected.

The specific Bayesian framework that the mission data processor 104 implements, at least in the depicted embodiment, is a recursive Bayes filter. Thus, as FIG. 1 depicts, the mission data processor 104 is supplied with a defined initial state for the probability of engine degradation due to movement through the locations associated with the mission 142. That is, an initial prognostication of what the expected result, in this case engine degradation, would be. This initial state may be based, for example, on engineering judgment and/or engineering experience and/or area of operation, just to name a few. Using the defined initial state 142 and the location independent degradation data, the retrieved engine degradation data are adjusted to more accurately predict engine degradation due to vehicle movement through each discrete portion (e.g., location, cell, voxel, etc.) of the executed mission 144. The adjusted data 144 is then used to calculate, with ever increasing precision, predictions of path dependent engine degradation 146. These data are also supplied to, and stored in, the degradation database 106.

The degradation database 106 may be implemented using any one of numerous types of electronic storage media now known or developed in the future. The degradation database 106 may be disposed within the vehicle 102, remote from the vehicle 102, or a combination of both. In a particular embodiment, the degradation database 106 is "cloud-based," and is thus located remotely. It will additionally be appreciated that the mission data processor 104 is in operable communication with the degradation database 106 via a wired connection, a wireless connection, or a combination thereof. Regardless of its specific implementation and location, the degradation database 106 is configured to receive and store the engine degradation data supplied thereto from the mission data processor 104. The stored engine degradation data may be selectively retrieved from the degradation database 106 by the mission data processor 104.

As noted above, the mission data processor 104 is additionally configured to selectively evaluate various mission-related parameters 134, such as calculating a probability that one or more vehicles 102 can complete a new mission or missions, and evaluating one or more optimization criteria associated with a new mission or missions. The manner in which the mission data processor 104 implements this functionality is illustrated in greater detail in FIG. 2, and with reference thereto will now be described.

To implement the process 200, the mission data processor 104 is adapted to receive various input data. These data may be input locally or remotely via, for example, a non-illustrated user interface. Regardless of the source and location, these input data include data representative of one or more new missions 202, data representative of specified optimization criteria 204, and data representative of selected engine(s) 108 (i.e., vehicle(s)) that may be used to carry out the mission(s) and the specific mission path(s) 206. The data representative of one or more new missions 202 include various factors that may impact engine degradation during the proposed mission(s). These factors include, for example, weather conditions, vehicle load, ambient temperature and pressure, altitude, vehicle speed, wind velocity, and any one of numerous other factors that may impact engine degradation. The data representative of specified optimization criteria 204 may include, for example, one or more of fuel consumption, remaining engine life, power margin, safety margin, probability of mission success, or various combinations thereof, just to name a few.

The mission data processor 104, using the above-described input data 202-206, and data supplied from the degradation database 106, evaluates various mission parameters 208. The various mission parameters that are evaluated may vary, but include, for example, calculations of fuel usage, remaining engine life, safety margin, power margin, and probability of success, just to name a few. The evaluated parameters 208 are then compared to the specified optimization criteria 204 using, for example, a cost function 212. Based on this comparison 212, a determination is made as to whether or not the optimization criteria have been met 214. If so, the process 200 ends. If not, then new data representative of selected engine(s) 108 (i.e., vehicle(s)) and/or the specific mission path(s) 206 may need to be input, and the evaluation of the various mission parameters 208 repeats.

It will be appreciated that the mission data processor 104 evaluates many of the mission parameters 208 using processes that are generally known in the art. For example, numerous known processes exist for calculating fuel usage, remaining engine life, safety margin, power margin, etc. As such, the processes that the mission data processor 104 implements to evaluate these parameters are not further described herein, and are illustrated using a single functional block 216. However, the mission data processor 104 implements a unique process to evaluate the probability of mission. Thus, this process is depicted, and will now be described, in more detail.

The mission data processor 104 selectively retrieves, from the engine degradation database 106, the calculated predictions of path dependent engine degradation 218. As may be appreciated, the data that the mission data processor retrieves are based on the data representative of the selected engine(s) 108 (i.e., vehicle(s)) that may be used to carry out the mission(s) and the specific mission path(s) 206. The mission data processor 104 also retrieves, from one or more of the associated vehicle processors 120, the continuous performance analysis that was conducted during the previous flight, and thus the current power assurance value 222 for the engine(s) 108. Based on the current power assurance value 222 and the predicted engine degradation that will occur when the vehicle 102 executes the new mission 218, the predicted power available over the mission flight path is calculated 224.

Figure 2:
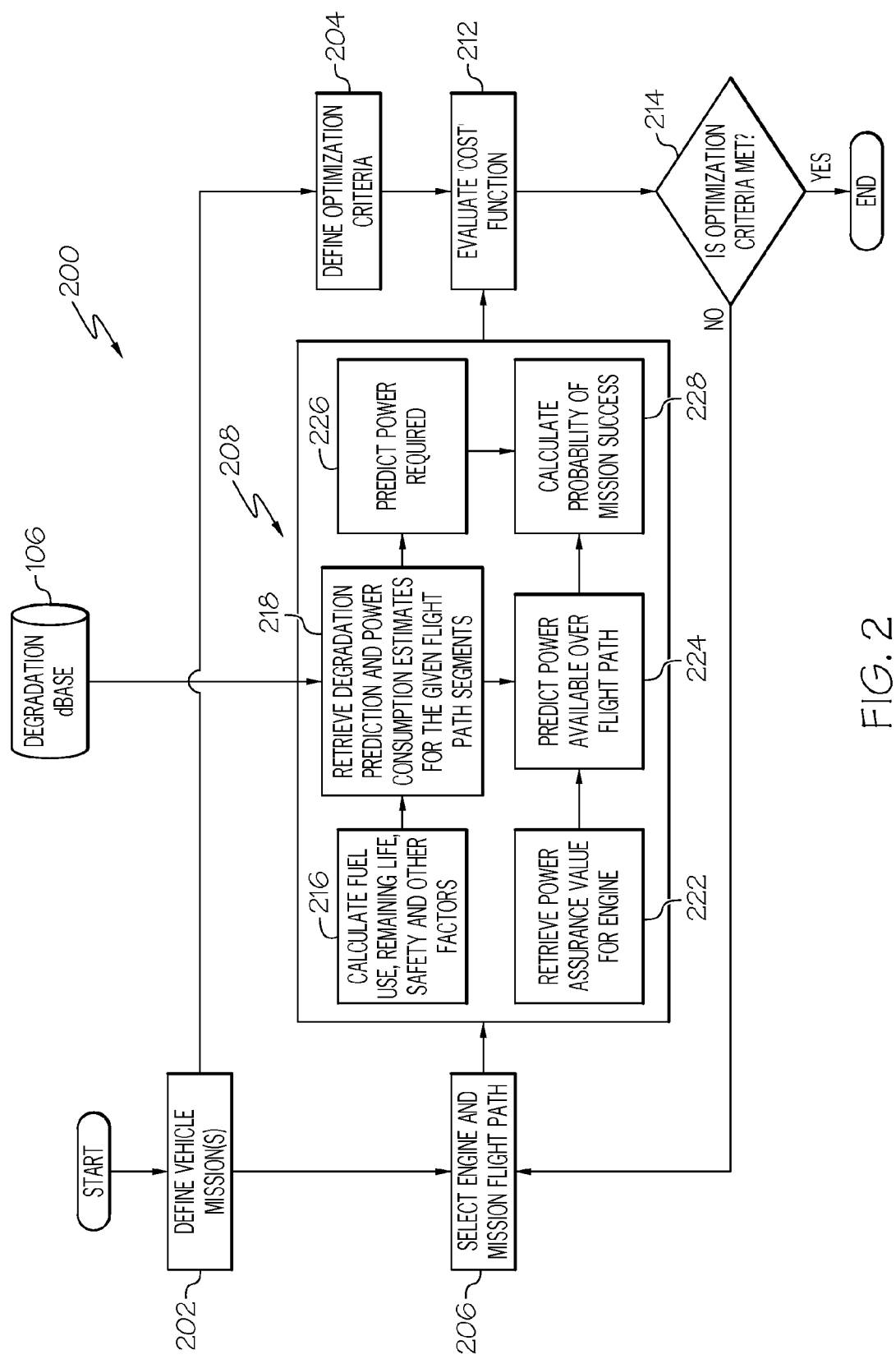
FIG. 2 depicts a process, in flowchart form, that may be implemented by the system of FIG. 1 to predict the mission capability of a vehicle.

As FIG. 2 further depicts, the predictions of path dependent engine degradation and power consumption estimates 218 are also used to predict the power required to carry out the mission(s) 226. The predicted power required 226 and the predicted power available 224 are then used to calculate a probability that the vehicle 102 will be able to complete the new mission 228. Operators and management officials may use this probability to decide whether the proposed new mission should be executed as planned, whether it should be aborted, or whether a new mission path should be proposed.

The system and method described herein allows personnel to predict vehicle/fleet capability over various time frames from single mission readiness to the prediction of remaining mission before engine(s) overhaul is required. The system and method described herein exploits past (data) experience, improves over time, places only minor demands on the data infrastructure, and provides statistically sound predictions.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for determining engine degradation for a vehicle that is propelled by an engine, the method comprising the steps of:
    collecting engine degradation data for the engine, the engine degradation data comprising calculations of engine degradation associated with a mission the vehicle has completed;
    generating, from the collected engine degradation data, location independent engine degradation data, the location independent engine degradation data representative of engine degradation that is independent of locations associated with the mission;
    calculating, from the collected engine degradation data and the location independent engine degradation data, predictions of location dependent engine degradation, the predictions of location dependent engine degradation representative of engine degradation due to movement through locations associated with the mission;
    conducting a continuous performance analysis for the engine; and
    generating the engine degradation data from the mission data and the continuous performance analysis;
    wherein the step of collecting engine degradation data comprises collecting mission data, the mission data including at least vehicle position data, and vehicle load data during the mission.

2. The method of claim 1, further comprising:
    dividing the mission into a plurality of discrete portions; and
    calculating the predictions of location dependent engine degradation for each discrete portion.

3. The method of claim 1, further comprising:
    calculating a probability that the vehicle can complete a new mission based in part on the calculated predictions of location dependent engine degradation.

4. The method of claim 3, further comprising:
    conducting a continuous performance analysis for the engine.

5. The method of claim 4, further comprising:
    generating the engine degradation data based in part on the continuous performance analysis.

6. The method of claim 4, wherein the step of calculating the probability that the vehicle can complete a new mission is based additionally on the continuous performance analysis.

7. The method of claim 1, further comprising:
    storing the collected engine degradation data in a database; and
    selectively retrieving the collected engine degradation data from the database.

8. The method of claim 1, wherein the mission data further includes weather data and avionics data.

9. The method of claim 1, wherein:
    the vehicle is an aircraft;
    the engine is a gas turbine engine; and
    the locations associated with the mission are each voxels.

10. The method of claim 1, further comprising:
    calculating the probability that the vehicle can complete a new mission for a plurality of flight paths to provide the probability of success, flight duration, fuel use, and one or more other factors to determine an optimal path.

11. The method of claim 1, further comprising:
    calculating from the collected engine degradation data, a probability that a fleet of vehicles, each with their own unique engine conditions, can complete a proposed set of missions is based in part on the calculated predictions of location dependent and independent engine degradations.

12. A vehicle mission capability prediction system, comprising:
    a mission data processor adapted to selectively receive engine degradation data associated with a vehicle that is propelled by an engine, the engine degradation data comprising a calculation of engine degradation associated with a mission the vehicle has completed, the mission data processor configured, upon retrieval of the engine degradation data, to:
        generate, from the collected engine degradation data, location independent engine degradation data, the location independent engine degradation data representative of engine degradation that is independent of locations associated with the mission;
        calculate, from the collected engine degradation data and the location independent engine degradation data, predictions of location dependent engine degradation, the predictions of location dependent engine degradation representative of engine degradation due to movement through locations associated with the mission; and
    a vehicle processor in operable communication with the mission data processor, the vehicle processor configured to:
        collect mission data, the mission data including at least vehicle position data, and vehicle load data during the mission;
        conduct a continuous performance analysis for the engine; and
        generate the engine degradation data from the mission data and the continuous performance analysis.

13. The system of claim 12, wherein the mission data processor is further configured to:
    calculate a probability that a vehicle can complete a new mission based on the calculated predictions of location dependent engine degradation.

14. The system of claim 12, wherein the mission data processor is further configured to:
    divide the mission into a plurality of discrete portions; and
    calculate the predictions of location dependent engine degradation for each discrete portion.

15. A vehicle mission capability prediction system, comprising:
    a database coupled to receive and store location independent engine degradation data and location dependent engine degradation data, the location independent engine degradation data representative of engine degradation that is independent of locations associated with a mission the vehicle has completed, the location dependent engine degradation representative of predictions of engine degradation due to movement through locations associated with the mission;

a vehicle processor configured to (i) collect mission data, the mission data including at least vehicle position data, vehicle load data during the mission, weather data, and avionics data, (ii) conduct a continuous performance analysis for the engine, and (iii) generate engine degradation data from the mission data and the continuous performance analysis; and a mission data processor in operable communication with the database and the vehicle processor, the mission data processor configured to selectively receive the mission data and the engine degradation data and, upon receipt of the mission data and the engine degradation data, to:
generate, from the engine degradation data, the location independent engine degradation data,
calculate, from the collected engine degradation data and the location independent engine degradation data, the predictions of location dependent engine degradation, and
calculate a probability that a vehicle can complete a new mission based on the calculated predictions of location dependent engine degradation and the continuous performance analysis.

16. The system of claim 15, wherein the mission data processor is further configured to:
divide the mission into a plurality of discrete portions; and
calculate the predictions of location dependent engine degradation for each discrete portion.

17. The system of claim 15, wherein the mission data processor is further configured to calculate the probability that the vehicle can complete a new mission for a plurality of flight paths to provide the probability of success, flight duration, fuel use, and one or more other factors to determine an optimal path.

18. The system of claim 15, wherein the mission data processor is further configured to calculate from the collected engine degradation data, a probability that a fleet of vehicles, each with their own unique engine conditions, can complete a proposed set of missions is based in part on the calculated predictions of location dependent and independent engine degradations.

* * * * *